United States Patent [19]

Poeschel et al.

[11] Patent Number: 4,471,017

[45] Date of Patent: Sep. 11, 1984

[54] HIGH-TEMPERATURE AND THERMAL-SHOCK-RESISTANT THERMALLY INSULATING COATINGS ON THE BASIS OF CERAMIC MATERIALS

[75] Inventors: Eva Poeschel, Bad Soden; Guido Weibel, Dankelshausen; Wolfgang Schwämmlein, Frankfurt am Main, all of Fed. Rep. of Germany

[73] Assignee: Battelle-Institut e.V., Frankfurt am Main, Fed. Rep. of Germany

[21] Appl. No.: 420,916

[22] Filed: Sep. 21, 1982

[30] Foreign Application Priority Data

Sep. 23, 1981 [DE] Fed. Rep. of Germany ....... 3137731

[51] Int. Cl.[3] ........................................ B32B 7/02

[52] U.S. Cl. ........................... 428/215; 428/472; 220/422; 220/429; 123/193 H; 123/657

[58] Field of Search ................ 428/472, 215; 220/422, 220/429, 468

[56] References Cited

U.S. PATENT DOCUMENTS

| | | | |
|---|---|---|---|
| 3,031,331 | 4/1962 | Aves, Jr. | 117/46 |
| 3,293,064 | 12/1966 | Aves | 117/46 |
| 3,715,265 | 2/1973 | Allen et al. | 428/472 X |
| 3,836,392 | 9/1974 | Lux et al. | 428/472 X |
| 4,109,031 | 8/1978 | Marscher | 428/472 X |
| 4,269,903 | 5/1981 | Clingman et al. | 428/472 X |

*Primary Examiner*—Patricia C. Ives

*Attorney, Agent, or Firm*—Fisher, Christen & Sabol

[57] ABSTRACT

A high-temperature and thermal-shock-resistant thermal insulating coating based upon flame- or plasma-sprayed ceramic materials. The coating consists of several layer sequences essentially of the same materials. Each layer sequence contains at least one ceramic and one cermet layer, and/or one ceramic and one metal layer, and/or one cermet and one metal layer.

14 Claims, 2 Drawing Figures

HIGH-TEMPERATURE AND THERMAL-SHOCK-RESISTANT THERMALLY INSULATING COATINGS ON THE BASIS OF CERAMIC MATERIALS

BACKGROUND OF THIS INVENTION

1. Field Of This Invention

This invention relates to a high-temperature and thermal-shock-resistant thermal insulating coating based on flame- or plasma-sprayed ceramic materials.

2. Prior Art

High temperature-resistant coatings based on zirconium dioxide and/or zirconium silicate and nickel-aluminum or nickel-aluminum-chromium alloys are known. During the production of such coatings, the concentration of the metal component is gradually changed from one layer to another so that the concentration of metal is lowest in the layer facing the heat source. The major drawback of such coatings is that they are limited in thickness, as the individual oxide or silicate-containing layers can only be sprayed on up to specific layer thicknesses. Furthermore, the thermal-shock-resistance of such coatings is not sufficient and decreases with an increasing number of layers. Therefore, their thermal insulating properties are not sufficient as such properties are dependent on thickness.

BROAD DESCRIPTION OF THIS INVENTION

An object of this invention is to provide a coating for metallic substrates, such coating having thermal insulating properties and high-temperature and thermal-shock-resistance. Another object of this invention is to provide a process for the use of such coated metal substrate. Other objects and advantages of this invention are set out herein or are obvious herefrom to one ordinarily skilled in the art.

The objects and advantages of this invention are achieved by the coating and process of this invention.

This invention involves a coating for metal substrates. The coating consisting of several layer sequences essentially of the same materials, each layer sequence containing at least one ceramic and one cermet and/or one ceramic and one metal and/or one cermet and one metal layer. The coating of the invention is a high-temperature and thermal-shock-resistant thermal insulating coating and is formed of flame- or plasma-sprayed ceramic materials.

Preferably the coating of this invention has a thickness of at least 200 μm, and preferably the individual layers each have a thickness of 6 to 1000 μm, most preferably of 50 to 200 μm. Preferably the layers have different thicknesses. A preferred arrangement is where the metal and cermet layers have the same thickness, and the thicknesses of the ceramic layers increase in the direction towards the surface layer. Another preferred arrangement is where the ceramic layers have the same thickness, and the thickness of the metal and cermet layers decrease in the direction towards the surface layer.

A further preferred arrangement is where the thicknesses of the ceramic layers increase in the direction towards the surface layer and the thicknesses of the metal and cermet layers decrease in the direction towards the surface layer. The concentration of the metallic component in the cermet layers preferably gradually decreases in the direction towards the surface layer. The layers are preferably wear and corrosion resistant. The cermet layers preferably consist of a metal, most preferably of nickel-aluminum or nickel-chromium-aluminum, and stabilized zirconium dioxide and/or zirconium silicate. The ceramic layers preferably consist of stabilized zirconium dioxide and/or zirconium silicate. Preferably the surface layer subject to load consists of zirconium dioxide and/or zirconium silicate and preferably has a larger thickness than the other layers. Preferably the coating is removably produced on a substrate and has an outer layer of a metallic material by means of which the coating can be connected to a metallic component.

This invention also includes a process for using the coating of this invention in a combustion chamber of a driving unit having a reducing or oxidizing atmosphere.

An essential feature of the flame-sprayed or plasma-sprayed coatings of this invention is that, contrary to the prior art, the functional thermal insulating coating does not consist of a single monolithic layer which is limited in its thickness to about 1 to 2 mm and which must be durable connected with the base component by means of several adhesive layers. The coating of this invention consists of several ceramic and cermet, and/or ceramic and metal, and/or cermet and metal layers which are arranged in an alternative sequence in laminated form. This structure permits higher layer thicknesses and thus better thermal insulation is achieved. The thermal insulation of the laminate structure according to this invention at elevated temperatures and specially of a structure consisting of very thin laminar layers, is as high as that of the known monolithic ceramic coatings, although the laminate structure of this invention contains metallic components. Not only the mechanical load capacity, for example in the case of impact, but also the thermoshock resistance of the invention coating are much better than those of ceramic coatings.

In the coatings according to the invention, zirconium dioxide is used which is preferably stabilized with magnesium oxide, calcium oxide or yttrium oxide. The stabilizing oxide addition has to be selected according to the thermal load to which the coating is subjected under working conditions. For high thermal loads of up to about 1600° C., zirconium dioxide stabilized with yttrium dioxide can be used. For lower thermal loads of up to about 100° C., calcium oxide or magnesium oxide additions are sufficient. Instead of zirconium dioxide layers, it is also possible to use zirconium silicate layers or layers consisting of mixtures of zirconium dioxide and zirconium silicate.

In general, thermal insulation requires lower thermal conductivity. This, in turn, calls for the maximum possible porosity of the layers, in addition to the given material-specific properties. With increasing porosity, however, the strength of the material and its stability under load decrease, to that increasing mechanical load at unchanged thermal insulation requires higher layer thicknesses and reduced porosity. According to this invention, the porosity of the ceramic layers is between about 3 and 15 volume percent.

The cermet layers consist of, for example, stabilized zirconium dioxide and/or zirconium silicate as well as of a metal component. The metals preferably used are nickel-aluminum or nickel-chromium-aluminum alloys. The metal layers which are also contained in the laminate preferably consist of the same alloys as are contained in the cermet layers.

Heavy duty coatings with high thermal-shock resistance contain layers of the layer sequences having thicknesses which are as thin as possible. The total thickness of the laminate preferably ranges between 0.2 and 10 mm; the individual layers can have thicknesses between 5 and 1000 μm, preferably between 50 and 200 μm. The minimum achievable layer thickness depends on the grain size of the powders used and is around 5 μm. The individual layers can be of the same or different thickness. According to one embodiment, the repeating metal and cermet layers can have the same thickness, while the thickness of the repeating ceramic layers gradually decreases in the direction towards the surface layer. According to another embodiment, the ceramic layers can have the same thickness, whereas the thicknesses of the metal and cermet layers gradually decrease in the direction towards the surface layer. Ceramic layers can be provided which gradually increase in thickness in the direction towards the surface layer, and between them metal or cermet layers gradually decreasing in thickness in the direction towards the surface layer. Another modification consists in decreasing metal concentrations in the cermet layers in the direction towards the surface layer. Preferably, the outer layer of the coatings according to this invention facing the heat source is coated with a ceramic, corrosion or wear prevention material.

BRIEF DESCRIPTION OF THE DRAWING

This invention is illustrated with reference to a schematic drawing, wherein.

DETAILED DESCRIPTION OF THIS INVENTION

Figure 1:
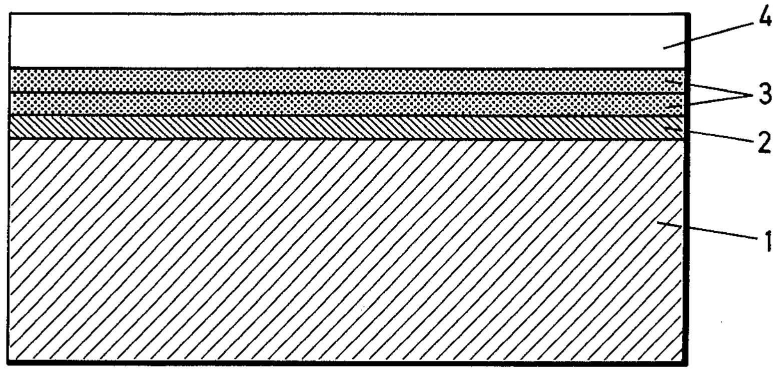
FIG. 1 shows the standard structure of known thermally insulating systems on the basis of $ZrO_2$.

As shown in FIG. 1, the known layer system(s) consists of metallic substrate material 1, metallic adhesive layer 2, several cermet intermediate layers 3 and ceramic surface layer 4. The thermal expansion coefficients of substrate 1 and ceramic surface layer 4 are normally very different from each other. For their compensation several cermet intermediate layers 3 are arranged between substrate 1 and surface layer 4. Such an arrangement is rather limited in its total layer thickness. The known systems have total layer thicknesses of about 2 mm. Total layer thicknesses of more than 2 mm cause a reduction of thermal shock resistance.

Figure 2:
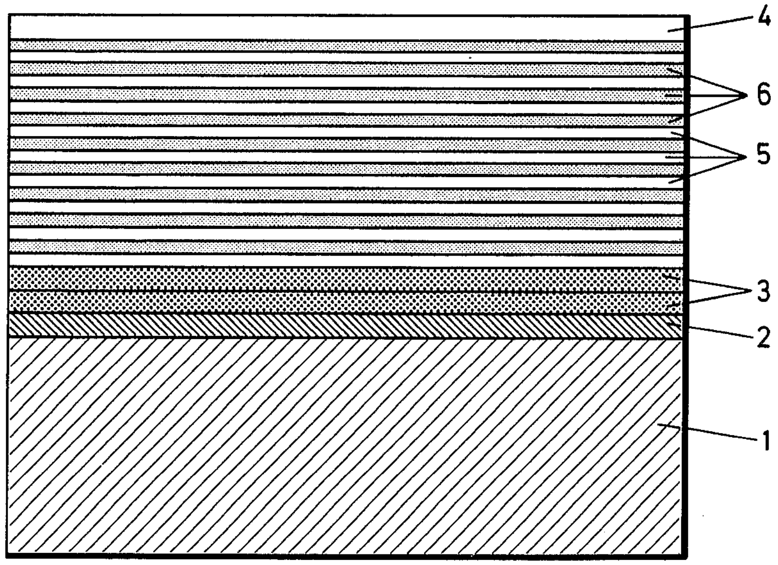
FIG. 2 shows an embodiment of the coating according to this invention.

The coating according to this invention is shown in FIG. 2. Several alternatingly-arranged oxide or silicate layers 5 and metal or cermet layers 6 are provided between ceramic surface layer 4 and metallic adhesive layer 2. Such an arrangement permits insulating layers to be produced, whose properties are many times better than those of the conventional systems. In spite of the sometimes significant difference in the thermal expansion coefficients of the arranged layers, it is possible, according to this invention to obtain thermal-shock resistant, thermal insulating coatings which are resistant to high thermal loads. The thermal-shock resistance increases with decreasing thicknesses of the individual layers of the layer sequence of the laminated structure.

The layers shown in FIG. 2 can be produced according to the known methods of flame- or plasma-spraying [H. S. Ingham and A. P. Shopard, Metco Flame Spray Handbook, Volume III, Plasma Flame Process, Metco Ltd., Chobham, Woking, England (1965)]. Also by using flame- or plasma-spraying techniques, components of geometrically complicated shape can be provided with coatings according to this invention. Examples of such complicated shapes are rough, uneven surfaces, piston heads with indentations, pipe walls of the like. With these coating techniques according to this invention, heavy duty components can favorably be provided having individual layers of an appropriate material. Furthermore, by flame- or plasma-spraying an outer layer can be produced so that after removal of the substrate, the coating can be connected with a metallic component by welding, casting, soldering etc. This outer layer is usually a metallic layer.

The embodiment shown in FIG. 2 can be modified so that layers 5 and 6 are cermet and metal layers. Furthermore, the layer sequence between surface layer 4 and adhesive layer 2 can be a four-layer or six-layer sequence of ceramic-cermet and/or ceramic-metal and/or cermet-metal.

Laminated systems, such as compact materials consisting of metal and ceramic, are known and are produced by sintering or hot melting. These methods cannot be used for the coating of metallic components having geometrically-complicated shapes. Furthermore, the porosity of the individual layers cannot be modified in order to achieve heavy duty structures, and the thicknesses of the individual layers cannot be easily modified. This, however, can be achieved by flame- or plasma-spraying methods. In the production of compact parts and by means of flame- or plasma-spraying techniques, materials can be sprayed on as an outer layer in a single production-step thereby enabling the structures produced to be joined with other materials by welding, molding, building-up welding and soldering and the like.

The following examples show details of this invention:

EXAMPLE 1

(Metal/Cermet-Laminated Structure)

For the production of a pipe segment consisting of the laminated material according to this invention, a cylindrical aluminum core was heated, sprayed with a sodium chloride solution and heated further to 300° C. Subsequently, the thermal insulating layers shown in Table I were deposited onto the core using a plasma gun. Nickel was deposited as an outer layer enabling the soldering of the pipe within a pipe-shaped component.

Because of the different thermal expansion coefficients of aluminum and of the laminated structure according to this invention, the core can be easily removed from the laminate upon cooling. The separation of both parts can be carried out more favorably by immersion in water, i.e., by dissolving sodium chloride. The pipe segment of laminated structure according to this invention had an inside diameter of 100 mm and a length of 50 mm. It was inserted in the pipe shaped component and joined with it by means of soldering. For this purpose the pipe segment was enveloped with a solder sheet (soft solder) of an adequate shape, inserted into the pipe-shaped component and heated up to 350° C. Table I shows the layer sequence starting from the internal wall of the pipe-shaped component:

TABLE I

| Layer Sequence No. | Layer Thickness, μm | Material-Composition, weight % Metal (NiAlCr) | Ceramic $ZrO_2$ (CaO stab.) | |
|---|---|---|---|---|
| 1 | 200 | 100 | 0 | metal |
| 2 | 50 | 60 | 40 | cermet |
| 3 | 50 | 100 | 0 | metal |
| 4 | 50 | 60 | 40 | cermet |
| 5 | 50 | 100 | 0 | metal |
| 6 | 50 | 60 | 40 | cermet |
| 7 | 50 | 100 | 0 | metal |
| 8 | 50 | 60 | 40 | cermet |
| 9 | 50 | 100 | 0 | metal |
| 10 | 50 | 60 | 40 | cermet |
| 11 | 50 | 100 | 0 | metal |
| 12 | 50 | 60 | 40 | cermet |
| 13 | 50 | 100 | 0 | metal |
| 14 | 50 | 60 | 40 | cermet |
| 15 | 50 | 100 | 0 | metal |
| 16 | 50 | 60 | 40 | cermet |
| 17 | 50 | 100 | 0 | metal |
| 18 | 50 | 60 | 40 | cermet |
| 19 | 50 | 100 | 0 | metal |
| 20 | 50 | 60 | 40 | cermet |

For experimental purposes three pipe segments of different layer thicknesses were produced. Pipe segment No. 1 consisted of 5 layers, pipe segment No. 2 of 11 and pipe segment No. 3 of 20 layers. Additionally, the pipe segments had an outer nickel layer of 50 mm thickness. Pipe segment Nos. 1 and 2 did not withstand the thermal tensions upon cooling after soldering of the pipe segments with the components. Favorable results were obtained with the third pipe segment which had a total wall thickness of 1.2 mm.

EXAMPLE 2

(Ceramic/Cermet-Laminated Structure)

For the thermal insulation of a piston head (diesel engine), the piston head was degreased, sandblasted and then the layers were deposited onto it by means of plasma spraying. The layer sequence is shown in Table II:

TABLE II

| Layer Sequence No. | Layer Thickness, μm | Material-Composition, weight % Metal (NiAlCr) | Ceramic $ZrO_2$ (CaO stab.) | |
|---|---|---|---|---|
| 1 | 100 | 100 | 0 | metal |
| 2 | 100 | 66 | 34 | cermet |
| 3 | 100 | 33 | 67 | cermet |
| 4 | 50 | 0 | 100 | ceramic |
| 5 | 50 | 33 | 67 | cermet |
| 6 | 50 | 0 | 100 | ceramic |
| 7 | 50 | 33 | 67 | cermet |
| 8 | 50 | 0 | 100 | ceramic |
| 9 | 50 | 33 | 67 | cermet |
| 10 | 50 | 0 | 100 | ceramic |
| 11 | 50 | 33 | 67 | cermet |
| 12 | 50 | 0 | 100 | ceramic |
| 13 | 50 | 33 | 67 | cermet |
| 14 | 50 | 0 | 100 | ceramic |
| 15 | 50 | 33 | 67 | cermet |
| 16 | 50 | 0 | 100 | ceramic |
| 17 | 50 | 33 | 67 | cermet |
| 18 | 50 | 0 | 100 | ceramic |
| 19 | 50 | 33 | 67 | cermet |
| 20 | 50 | 0 | 100 | ceramic |
| 21 | 50 | 33 | 67 | cermet |
| 22 | 50 | 0 | 100 | ceramic |
| 23 | 50 | 33 | 67 | cermet |
| 24 | 200 | 0 | 100 | ceramic |

Also here three coatings having different thicknesses were produced in order to test their thermal insulating properties and the effect of the thermal insulation on the combustion operation.

Piston head No. 1 consisted of 6 layers, piston head No. 2 of 12 layers and piston head No. 3 of 24 layers. Piston head Nos. 1 and 2 had final layers, the thicknesses (differing from the value given in Table II) of which are 200 μm. All three piston heads were tested in a run in a diesel engine (1 cylinder testing engine MWM KD 12E) for a period of 10 hours without any damage to the coatings.

EXAMPLES 3 AND 4

(Metal/Ceramic-, and Ceramic/Cermet/Ceramic/Metal-Laminated Structure)

The layer sequence shown in Table III was deposited onto an inlet valve and an outlet valve (50 mm diameter) in order to thermally insulate the combustion chamber of a diesel engine and to protect the machine part against thermal overload. The valves must withstand not only thermal load but also mechanical load. Therefore, and for the improvement of the impact resistance, additional metallic layers were provided for in the layer sequence. This structure is shown in Table IV. The valves were tested in a testing engine, as above, during a run of 100 hours without any damage to the coatings.

TABLE III

| Layer Sequence No. | Layer Thickness, μm | Material-Composition, weight % Metal (NiAlCr) | Ceramic $ZrO_2$ (CaO stab.) | |
|---|---|---|---|---|
| 1 | 150 | 100 | 0 | metal |
| 2 | 150 | 66 | 34 | cermet |
| 3 | 150 | 33 | 67 | cermet |
| 4 | 100 | 0 | 100 | ceramic |
| 5 | 50 | 100 | 0 | metal |
| 6 | 100 | 0 | 100 | ceramic |
| 7 | 50 | 100 | 0 | metal |
| 8 | 100 | 0 | 100 | ceramic |
| 9 | 50 | 100 | 0 | metal |
| 10 | 100 | 0 | 100 | ceramic |
| 11 | 50 | 100 | 0 | metal |
| 12 | 300 | 0 | 100 | ceramic |

TABLE IV

| Layer Sequence No. | Layer Thickness, μm | Material-Composition, weight % Metal (NiAlCr) | Ceramic $ZrO_2$ (CaO stab.) | |
|---|---|---|---|---|
| 1 | 100 | 100 | 0 | metal |
| 2 | 100 | 67 | 33 | cermet |
| 3 | 100 | 33 | 67 | cermet |
| 4 | 50 | 0 | 100 | ceramic |
| 5 | 50 | 67 | 33 | cermet |
| 6 | 50 | 0 | 100 | ceramic |
| 7 | 50 | 100 | 0 | metal |
| 8 | 50 | 0 | 100 | ceramic |
| 9 | 50 | 67 | 33 | cermet |
| 10 | 50 | 0 | 100 | ceramic |
| 11 | 50 | 100 | 0 | metal |
| 12 | 50 | 0 | 100 | ceramic |
| 13 | 50 | 67 | 33 | cermet |
| 14 | 50 | 0 | 100 | ceramic |
| 15 | 50 | 100 | 0 | metal |
| 16 | 50 | 0 | 100 | ceramic |
| 17 | 50 | 33 | 67 | cermet |
| 18 | 150 | 0 | 100 | ceramic |

TABLE IV-continued

| Layer Sequence No. | Layer Thickness, $\mu m$ | Material-Composition, weight % Metal (NiAlCr) | Ceramic $ZrO_2$ (CaO stab.) | |
|---|---|---|---|---|
| 19 | 50 | 100 | 0 | metal |

What is claimed is:

1. A high-temperature and thermal-shock-resistant thermal insulating coating, formed of flame- or plasma-sprayed ceramic materials, consisting of several layer sequences essentially of the same materials, each layer sequence containing at least one ceramic and one cermet layer and/or one ceramic and one metal layer and/or one cermet and one metal layer.

2. Coating as claimed in claim 1 wherein the coating thickness is at least 200 $\mu m$ and that the individual layers each have a thickness of 6 to 1000 $\mu m$.

3. Coating as claimed in claim 1 or 2 where the layers have different thicknesses.

4. Coating as claimed in claim 3 wherein the metal and cermet layers have the same thickness, and the thicknesses of the ceramic layers increase toward the surface layer.

5. Coating as claimed in claim 3 wherein the ceramic layers have the same thickness and the thicknesses of the metal and cermet layers decrease toward the surface layer.

6. Coating as claimed in claim 3 wherein the thicknesses of the ceramic layers increase toward the surface layer, and the thicknesses of the metal and cermet layers decrease toward the surface layer.

7. Coating as claimed in claim 3 wherein the concentration of the metallic component in the cermet layers gradually decreases toward the surface layer.

8. Coating as claimed in claim 3 wherein the layers are wear and corrosion resistant.

9. Coating as claimed in claim 3 wherein the cermet layers consist of a metal, and stabilized zirconium dioxide and/or zirconium silicate, and the ceramic layers consist of stabilized zirconium dioxide and/or zirconium silicate.

10. Coating as claimed in claim 3 wherein the surface layer subject to load consists of zirconium dioxide and/or zirconium silicate.

11. Coating as claimed in claim 3 wherein the coating is removably attached to the substrate and has an outer layer of a metallic material by means of which the coating is connected with a metallic component.

12. Coating as claimed in claim 1 wherein the its thickness is at least 200 $\mu m$ and that the individual layers each have a thickness of 50 to 200 $\mu m$.

13. Coating as claimed in claim 1 wherein the cermet layers consist of nickel-aluminum or nickel-chromium-aluminum, and stabilized zirconium dioxide and/or zirconium silicate, and the ceramic layers consist of stabilized zirconium dioxide and/or zirconium silicate.

14. Coating as claimed in claim 1 wherein the surface layer subject to load consists of zirconium dioxide and/or zirconium silicate and has a higher thickness than the other layers.

* * * * *